July 17, 1962  E. B. CANFIELD  3,044,305
INTEGRATING AND DIFFERENTIATING ACCELEROMETER
Filed Dec. 15, 1958

Inventor:
Eugene B. Canfield,
by Francis K. Doyle
His Attorney.

United States Patent Office 3,044,305
Patented July 17, 1962

3,044,305
INTEGRATING AND DIFFERENTIATING
ACCELEROMETER
Eugene B. Canfield, Pittsfield, Mass., assignor to General
Electric Company, a corporation of New York
Filed Dec. 15, 1958, Ser. No. 780,366
9 Claims. (Cl. 73—503)

This invention relates to electronic instrumentation systems, and more particularly to a differentiating accelerometer structure for use in stabilizing the servomechanisms employed in such systems.

In many modern day electronic instrumentation systems, use of a space-stabilized platform for position is made. Such systems commonly include automatic radar tracking systems, inertial guidance systems, missile odometers and the like. Platform-stabilized elements within airborne or shipborne weapons assemblies are, of course, equally common examples of such instrumentation systems.

The motion sensing means employed in these electronic instrumentation systems often takes the form of a tachometer generator. In theory, an electrical feedback signal responsive to motion is produced by the tachometer generator. However, a degenerative gain reducing action is invariably introduced into space-stabilized systems by the use of such tachometer error signal sensors. This is because motion between the stabilized platform and the vehicle, or other supporting structures, is sensed by such tachometer generators and erroneous feedback signals are thus introduced into the servoloop. In order to maintain proper overall performance for space-stabilizing servomechanisms, it has long been felt that the tachometer generator type of feedback signal must be entirely eliminated.

A device capable of sampling motion in space without regard to the movement of the supporting vehicle has been regarded as essential to the improvement of electronic instrumentation units used in space-stabilizing systems. The need for an accelerometer or equivalent device capable of deriving a signal representative of absolute acceleration has been regarded by those skilled in the art of feedback control systems as equally essential to the task of properly stabilizing such systems.

Accordingly, therefore, the present invention contemplates means for stabilizing servomechanism systems. The degenerative gain reducing effect caused by conventional error signal sampling instrumentalities is avoided by integrating-differentiating accelerometer embodiments which sense only the motion of a stabilized-platform with respect to space co-ordinates. As a result, motion between the supporting vehicle and the stabilized platform is incapable of causing the inventive structure to generate erroneous feedback signals.

The accelerometer structure of the present invention is mounted at load or platform speed in order to produce an accurate error signal. It will be understood that the term "mounted at load or platform speed" means that the entire accelerometer is mounted on the stabilized platform, and no portion of the accelerometer is in contact with the structure on which the stabilized platform is mounted. Thus any relative motion between the stabilized platform and the mounting structure is not sensed by the accelerometer. When thus mounted at load speed, the present invention provides a voltage signal responsive solely to motion in space. The stabilizing feedback signal thus derived completely fails to reflect the load motion relative to any other reference surface. In accordance with the present invention, signals are derived by exploiting the combined characteristics of a damped torsion pendulum and a tachometer movement. An inertial mass associated with the assembly is mounted to experience a constant force during periods of constant acceleration. Below the resonant frequency of the accelerometer suspension, an electromotive force proportional to the rate of acceleration is obtained. Above the resonant frequency, a feedback voltage proportional to velocity is derived. By employing both such signals the optimum stabilization of the space-stabilized servomechanisms is readily accomplished.

Accordingly, therefore, a primary object of the present invention is to provide a novel accelerometer structure for providing a feedback signal representative only of motion in space.

Another object of this invention is to disclose means for exploiting the characteristics of a damped torsion pendulum used in conjunction with a tachometer generator for stabilizing a servomechanism.

Still another object of the invention is to teach an inventive combination of vehicle-borne accelerometer elements adapted to produce a first feedback signal responsive to platform acceleration below the resonant frequency of the elements, and a second feedback signal responsive to platform velocity above the resonant frequency.

A further object of the invention is to teach a technique of exploiting the properties of a damped torsion pendulum in an accelerometer adapted for use in electronic instrumentation systems which require improved stabilizing signals for the component servomechanism loops contained therein.

A still further object of this invention is to provide means for providing a feedback signal having a controlled relationship to the motion in space of a particular object.

These and other objects and advantages of the present invention will become apparent by referring to the accompanying detailed description and drawings in which like numerals indicate like parts and in which.

Figure 1:
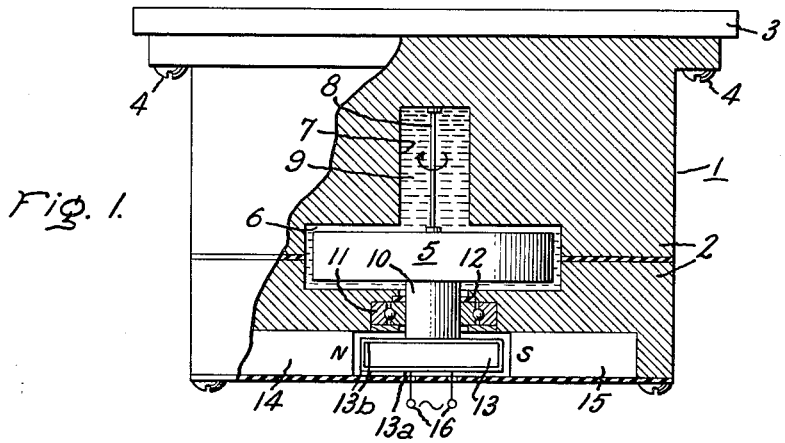
FIGURE 1 shows diagrammatically an embodiment of the integrating differentiating accelerometer structure in which a viscous damping medium is employed.

Turning now to the detailed description of the drawings, and more particularly to FIGURE 1 thereof, the reference numeral 1 has been used to indicate generally an integrating-differentiating accelerometer constructed according to the present invention. The accelerometer 1 will be seen to include a case 2 constructed of metal or other equally sturdy material. The case 2 is securely affixed to a platform 3 by means of screws 4 or other suitable fastening means. It will be understood that the platform 3 is a stabilized platform, which may be mounted on a structure such as an airborne weapons system. Thus, as previously pointed out, the entire accelerometer will be "mounted at load speed."

Within the case 2 there is provided an inertia wheel 5. The wheel 5 is accurately positioned within an annular chamber 6 which is centrally located within the case. The upper and lower horizontal surfaces of the inertia wheel 5 are separated from the oppositely disposed flat surfaces of the annular chamber by an accurately predetermined distance.

Directly above the annular chamber 6, and communicating therewith, the interior of the casing defines a second annular chamber 7. The end wall of the chamber 7 and the upper horizontal surface of the inertia wheel 5 are resiliently interconnected by means of a torsion spring 8, which is characterized by a carefully selected spring constant. The space within the annular chambers and around the inertia wheel 5 is filled with a damping fluid 9 of accurately predetermined viscosity and capacity for motion-attenuation. The necessity for correlating the spring constant of the spring 8 with the damping effect of the fluid 9 will be more fully appreciated later in the present specification when the significance of the various coefficients in the system equations is discussed.

Continuing with the detailed description of the invention, reference to FIGURE 1 is again made. It will be recalled in connection with this figure that the inertia wheel 5 is positioned to contact the viscous fluid 9 on its outer surfaces. The wheel 5 is also secured on its underside to a shaft 10 which is journaled for rotation in a set of ball bearings 11. It should be appreciated that other types of anti-friction devices may be used equally well to journal the accelerometer movement and support the inertia wheel, and that the invention is not limited to the use of ball bearings. For instance, the use of conventional crossed springs or torsion bars in supporting the inertia wheel would be deemed to fall within the purview of the invention.

The retention of the viscous damping fluid within the accelerometer may be accomplished by means of a conventional sealing member 12 shown diagrammatically above the bearing 11. The fluid 9 may be permitted to surround the tachometer 13 as well by eliminating sealing member 12. The portion of the shaft 10 which extends beyond the bearings 11 is connected to actuate a tachometer generator indicated generally by the reference numeral 13.

The tachometer generator 13 may comprise a conventional type of moving coil galvanometer movement. The generator 13 may thus include a moving coil 13a which contains convolutions of wire 13b as seen in the lower portion of FIGURE 1.

If desired, the total moment of inertia of the moving coil and its associated elements may be increased to permit the elimination of the inertia wheel 5, and such a modification will be understood to fall within the scope of the protection defined by the appended claims.

The convolutions of wire on the coil 13a are suspended in a field of magnetic flux emanating from a pair of field poles 14 and 15 located on the left and right side of the moving coil 13a respectively. As shown, the field poles 14 and 15 are mounted in the lower portion of the case 2, in any desired manner. It should be understood that either permanent magnets or electromagnets may be used to provide the exciting magnetic flux for the tachometer generator 13. Because of the limited angular deflection of the inertia wheel and associated structure, the signal developed by the tachometer is made directly available at output conductors 16, and the need for complex brush and slip-ring structure is eliminated. For the same reason, the convolutions of wire on the moving coil may take the form of one continuous winding which provides a single current-carrying armature conductor.

In operation, values of angular acceleration experienced by the case 2 cause a displacement of the inertia wheel 5 with respect thereto. With an unbalanced inertia wheel or in other obvious physical arrangements the accelerometer may also be made responsive to linear motion. The angle of displacement between the case and the inertia wheel is constant as long as the acceleration remains constant. However, changes in the value of acceleration vary the angle of wheel displacement, and rotate the tachometer coil within its flux field to induce an output voltage at conductors 16. Below $w_0$, the resonant frequency, this output voltage is characterized by a magnitude proportional to the rate of change of angular acceleration. The utility of this voltage in stabilizing servo systems, such as direct drive motor servomechanisms will become apparent as the detailed theory of operation of the invention progresses.

Figure 2:
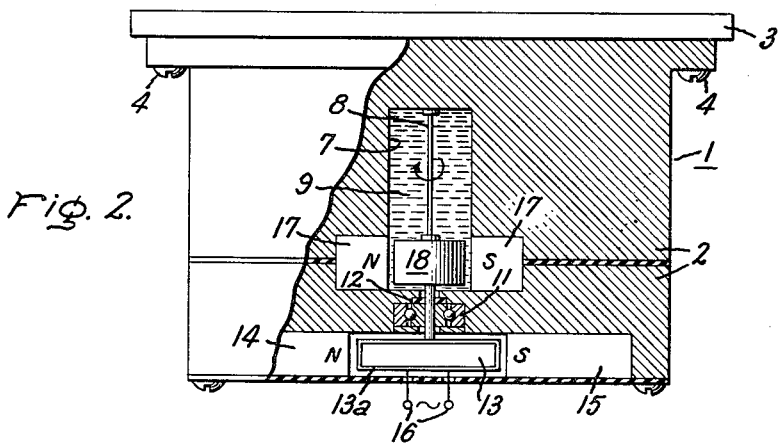
FIGURE 2 shows diagrammatically a modification of the invention structure in which electromagnetic damping is used.

Continuing now with the description of the several figures of the drawings, and more particularly with the embodiment of the invention shown in FIGURE 2 thereof, the use of electromagnetic damping in the present integrating differentiating accelerometer will now be discussed. In this figure, like reference numerals have been employed to designate parts which correspond to similar structural elements in FIGURE 1.

Thus, the reference numeral 2 has again been used to designate a case provided with a hollow annular chamber 7 therewithin. In addition, the embodiment of the invention shown in this figure is also provided with a tachometer 13. The movement 13 includes a moving coil 13a positioned to intercept magnetic flux produced by field poles 14 and 15. The moving coil 13a may include that quantity of inertia required to permit the elimination of a separate inertia wheel, as explained in connection with FIGURE 1. Relative angular movement between the coil 13a and the case 2 is opposed by a torsion spring 8 shown in the upper portion of the chamber 7. Such angular displacement is also opposed by the induction motor or eddy current type damping effected by the field poles 17 and rotor member 18. The field poles 17 shown in FIGURE 2 may take the form of permanent magnets or electromagnets. Where electromagnetic excitation is employed in field poles 14 and 15, the poles 17 may derive exciting ampere-turns from the same source of potential.

Rotor 18 is spatially interposed between poles 17 in order to intercept the magnetic flux existent therebetween. The rotor 18 may be fabricated of an electrically conductive non-magnetic material such as copper, stainless steel, or the like. As will be understood by those skilled in the art, the angular deflection of the rotor 18 within the flux field provided by poles 17 will cause induced currents to flow within the rotor. The fluxes which accompany such currents will of course, by Lenz's law, have a direction which causes the rotor to oppose the deflecting torque. The restraint thus effected by the rotor and field poles in FIGURE 2 may be regarded as analogous to that provided by the viscous damping fluid in FIGURE 1, and is additive to the restraint effected by the torsion spring 8. It should be appreciated that the embodiment of the invention shown in FIGURE 2 is provided with suitable anti-friction means such as the bearings 11, as well as with a sealing member 12 which functions to exclude atmospheric impurities from the interior of the accelerometer unit.

Turning now from the detailed description of the several structural embodiments of the accelerometer, reference will be made to the inverse transfer function of the invention illustrated in FIGURE 3. The appreciation of the benefits offered by the inventive structure in stabilizing servomechanisms is expedited by an understanding of FIGURE 3. In specifying the performance of the invention in symbolic notation, let:

(1) $a$ = inertia wheel position referred to the case.
  $\theta$ = case position in space.
  $J$ = moment of inertia of inertia wheel and/or rotor.
  $B$ = damping constant (viscous or magnetic).
  $K$ = spring constant of torsion spring.
  $E$ = tachometer output potential available at conductors 16.
  $K_T$ = tachometer voltage constant.
  $p$ = derivative symbol.
(2) Then, if: $Jp^2(\theta - a) = Bpa + Ka$, and
(3) $a/p^2\theta = (J/K)/[(J/K)p^2 + (B/K)p + 1]$
(4) and $E = K_T pa$
(5) $E/\phi = p^3 K_T(J/K)/[(J/K)p^2 + (B/K)p + 1]$ In order to simplify the notation, and emphasize the characteristic appearance of the servomechanism equations, substitute:

(6) "C" for $K_T(J/K)$
  "T" for $(J/K)^{1/2}$
  "2ZT" for $(B/K)$, and let
  "Z" = damping factor Then, the inverse transfer function of either embodiment of the inventive integrating-differentiating accelerometer may be defined as:

(7) $\phi/E=(T^2p^2+Tp+1)/p^3C$

The denominator will be recognized by those skilled in the art as the characteristic second order differential equation for a system which may be underdamped, overdamped, or critically damped, depending upon the character of the roots of the equation.

Figure 3:
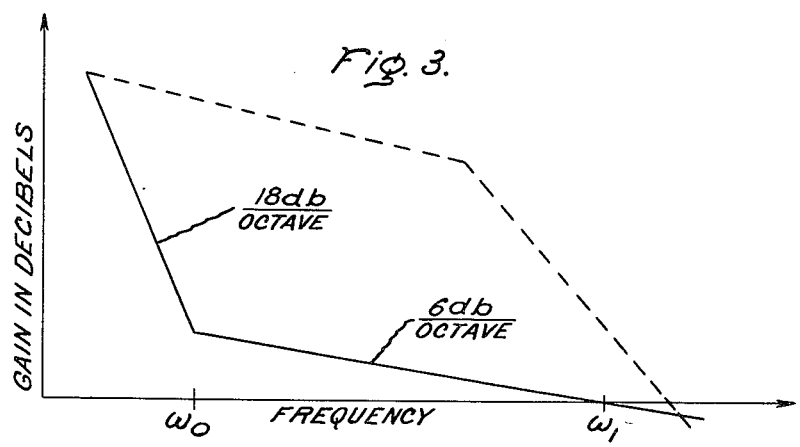
FIGURE 3 illustrates a graph of the inverse transfer function of the integrating differentiating accelerometer structure.

The appearance of the inverse transfer function given in Equation 7 is illustrated in FIGURE 3. Below the resonant frequency for the accelerometer structure ($w_0$) the voltage output of the accelerometer is proportional to the rate of acceleration. On the other hand, the output signal above the resonant frequency is proportional to the velocity. The slope of the inverse transfer function is thus specified as 18 decibels per octave below the resonant frequency, and 6 decibels per octave above this frequency. The desirability of the latter-mentioned slope in servo system stabilization will be appreciated by those skilled in the art of feedback control systems.

The stabilization of many diverse types of servo-mechanisms is rendered possible by the present invention. For instance, one unusually efficient stabilization technique may be accomplished by substituting the present invention for the conventional feedback tachometer which is used with double lead resistor-capacitor networks.

Turning momentarily to FIGURE 3 again, mention should be made of the fact that the inventive structure permits proportioning of the damping and the movable mass within the unit in order to diminish phase angle reflections which occur at the cross-over frequency $w_1$. The resonant frequency $w_0$ may more closely approach the cross-over frequency in this manner, than with more conventional systems. The low frequency gain of the inverse transfer function may be appreciably increased. Thus, both the damping factor and the resonant frequency of the several embodiments of the integrating-differentiating accelerometer disclosed herein may be proportioned to definite values which reflect the design requirements of particular servomechanism sought to be stabilized.

In conclusion, it will now be seen that the embodiments of the integrating-differentiating accelerometer have been described in detail in accordance with the requirements of the patent statute. However, it will be obvious that many substitutions, modifications, and alterations may be made in the disclosed embodiments without departing from the spirit and scope of the invention as set forth in the appended claims.

What I claim is:

1. In an integrating-differentiating accelerometer which includes casing means, rotatable means including the movable element of a potential generating means of accurately predetermined moment of inertia positioned within said casing means, biasing means connected to oppose rotation of said rotatable means with respect to said casing means and resiliently disposed therebetween, and damping means disposed within said casing to attenuate rotational excursions of said rotatable means, said damping and biasing means having values such that said accelerometer has an output proportional to the derivative of acceleration below the accelerometer resonant frequency and to the integral of acceleration above the accelerometer resonant frequency.

2. In an integrating-differentiating accelerometer which includes a casing, a rotatable mass having a predetermined moment of inertia which includes a tachometer coil mounted in a flux field within said casing for rotational movement with respect thereto, an elongated spring mounted as part of said mass to link an interior surface of said casing to said tachometer coil to resist angular displacement thereof, and means including damping means disposed within said casing to produce an additional force in opposition to angular displacements of said rotatable mass.

3. In an integrating-differentiating accelerometer for producing an electrical output signal responsive solely to the motion of a given movable object in space, means mounted on a platform stabilized with respect to space coordinates, said means defining a casing for said accelerometer, a tachometer provided with a moving coil characterized by a predetermined quantity of inertia rotatably mounted within said casing, spring means resiliently connected between an interior surface of said casing and said moving coil to coincide with the axis thereof, and damping means disposed within said casing to assist said spring means in providing force to restrain angular deflections by said moving coil.

4. In an integrating-differentiating accelerometer for producing an electrical output signal responsive solely to the motion of a given movable object in space, a hollow apertured case mounted on said object to experience space-motion; a tachometer generator provided with a movable coil journaled for rotation within said case, said coil having an accurately predetermined quantity of inertia associated therewith, and the mounting of said case being such that said coil will rotate solely in response to movement of said object; a torsion spring resiliently interconnected along a prolongation of the axial center line of said movable coil and an internal point within said case normal thereto, means including a pair of magnets positioned within said case to provide a flux field, and rotor means mounted to rotate simultaneously with said movable coil and said torsion spring and disposed within said flux field to experience eddycurrent damping therewithin.

5. In an integrating-differentiating accelerometer for producing an electrical output signal responsive solely to the motion of a given movable object in space, a hollow apertured case connected to said object to experience space-motion; a tachometer generator provided with a movable coil journaled for rotation within case, said coil having an accurately predetermined quantity of inertia associated therewith, and the mounting of said case being such that said coil will rotate solely in response to movement of said object; a torsion spring resiliently interconnected along a prolongation of the axial center line of said movable coil and an internal point within said case normal thereto, and means within said case including a magnetic flux field for providing an electromagnetic damping action to restrain the angular motion of said movable coil.

6. In an integrating-differentiating accelerometer for producing an electrical output signal responsive solely to the motion of a given movable object in space, a hollow apertured case mounted to experience space displacements of said movable object, a tachometer generator having a movable element journaled for restrained rotation within said case, an inertia wheel positioned within said apertured case and connected to said movable element for simultaneous rotational displacement therewith the mounting of said case being such that said inertia wheel and the movable element of said tachometer generator will rotate solely in response to movement of said object, a torsion spring resiliently interconnected between an aperture-defining surface within said case and a radial face of said inertia wheel, and a viscous damping medium disposed within said apertured case to assist said torsion spring in restraining rotational displacements of said inertia wheel and the movable element of the tachometer generator.

7. In a differential accelerometer for producing an electrical output signal responsive solely to the motion of a given movable object in space, casing means mounted on said object by a platform stabilized with respect to space coordinates, voltage producing means having a movable element mounted for rotation within said casing means to generate a potential responsive to the rate of said deflection thereof, means including an inertia wheel and a torsion spring mechanically coupled to said voltage producing means to exert a predetermined force in opposition to said rotation thereof, and a fluid medium with accurately predetermined damping properties disposed within casing means to contact the surfaces of said inertia wheel.

8. An accelerometer for stabilizing a servomechanism comprising: inertia means including the interconnected moving element of a tachometer, damping means disposed to attenuate motion of said inertia means, and biasing means connected to oppose rotation of said inertia means; said interconnected inertia, damping and biasing means having values such that said accelerometer has an output proportional to the derivative of acceleration below the accelerometer resonant frequency and to the integral of acceleration above the accelerometer resonant frequency; said resonant frequency being sufficiently below the servomechanism zero db crossover frequency to provide a desired velocity output above resonance and sufficiently below crossover to stabilize or prevent oscillation in the servomechanism.

9. An accelerometer for stabilizing a member; a member to be stabilized by a servomechanism including said accelerometer; means for mounting said accelerometer directly and entirely on said member; said accelerometer having inertia means including the interconnected moving element of a tachometer, damping means disposed to attenuate motion of said inertia means, and biasing means connected to oppose rotation of said inertia means; said interconnected inertia, damping and biasing means having values such that said accelerometer has an output proportional to the derivative of acceleration below the accelerometer resonant frequency and to the integral of acceleration above the accelerometer resonant frequency; said accelerometer having a resonant frequency as low as possible with the velocity output above resonance having a maximum frequency range.

References Cited in the file of this patent

UNITED STATES PATENTS

| | | |
|---|---|---|
| 2,577,061 | Woolson et al. | Dec. 4, 1951 |
| 2,656,519 | Sheppard | Oct. 20, 1953 |
| 2,853,287 | Draper et al. | Sept. 23, 1958 |

FOREIGN PATENTS

| | | |
|---|---|---|
| 630,650 | Great Britain | Oct. 18, 1949 |
| 681,824 | Great Britain | Oct. 29, 1952 |
| 713,550 | Great Britain | Aug. 11, 1954 |